(12) United States Patent
Haeuptle et al.

(10) Patent No.: US 10,452,517 B2
(45) Date of Patent: Oct. 22, 2019

(54) FRAMEWORK FOR TESTING LOGIC OF CODE BASED ON MODEL ELEMENTS

(71) Applicant: SAP SE, Walldorf (DE)

(72) Inventors: Klaus Haeuptle, Bad Shoenborn (DE); Kay Hammerl, Sankt Leon-Rot (DE); Nena Raab, Heidelberg (DE); Christian Edward Swanepoel, Neckarsteinach (DE); Klaus Ziegler, Neidenstein (DE); Jens Keller, Sankt Leon-Rot (DE)

(73) Assignee: SAP SE, Walldorf (DE)

( * ) Notice: Subject to any disclaimer, the term of this patent is extended or adjusted under 35 U.S.C. 154(b) by 723 days.

(21) Appl. No.: 14/552,563

(22) Filed: Nov. 25, 2014

(65) Prior Publication Data
US 2016/0147642 A1 May 26, 2016

(51) Int. Cl.
*G06F 11/36* (2006.01)

(52) U.S. Cl.
CPC ...... *G06F 11/3664* (2013.01); *G06F 11/3672* (2013.01); *G06F 11/3684* (2013.01)

(58) Field of Classification Search
CPC ............. G06F 11/3664; G06F 11/3684; G06F 11/3672
USPC ............................................ 703/14; 717/124
See application file for complete search history.

(56) References Cited

U.S. PATENT DOCUMENTS

| 8,806,437 B2* | 8/2014 | Arcese ................ G06F 11/3664 717/108 |
| 9,898,393 B2* | 2/2018 | Moorthi ................ G06F 11/368 |
| 2012/0174068 A1* | 7/2012 | Gutfleisch ........... G06F 11/3688 717/124 |

OTHER PUBLICATIONS

OFFIS DCMTK: OFFilenameCreator Class Reference [online], Jan. 6, 2011, Version 3.6.0 [retrieved on Apr. 4, 2017]. Retrieved from the Internet: <URL: http://support.dcmtk.org/docs/classOFFilenameCreator.html>.*

* cited by examiner

*Primary Examiner* — Eunhee Kim
(74) *Attorney, Agent, or Firm* — Buckley, Maschoff & Talwalkar LLC

(57) ABSTRACT

Various embodiments of systems and methods to provide a testing framework for testing code are described herein. In one aspect, a request to test at least a portion of code is received. A test model composed of model elements representing the portion of the code, code on which the portion of the code depends and one or more preexisting test doubles is generated. An option is provided to define one or more test double elements, in the test model, corresponding to the code on which the portion of the code depends. Further, an option is provided to alter dependencies between the model elements and the defined one or more test double elements in the test model. Furthermore, new one or more code artefacts are generated based on the test model and the generated new one or more code artefacts are executed to test logic of the portion of the code.

18 Claims, 16 Drawing Sheets

```
                    ╭─ ─ ─╮ ╭─405
          procedure │getSorted│ ( out sortedValues ) {
                    ╰─ ─ ─╯
         ╭─ ─ ─ ─╮ ╭─410
         │getValues│ ( out values := values );
         ╰─ ─ ─ ─╯
           for (value:values) {
             for (i:= 0;i++;i<sortedValues.length) {
               if (value > sortedValues.getAtIndex(i)) {
                 sortedValues.insertAtIndex(
                 exit;
               }
             }
             if (!sortedValues.contains(value)) sortedValues.append(value);
           }
          }
          procedure getValues ( out values ) {    ╭─415
                                            ╭─ ─ ─ ─╮
            values := select * from│"Master.View"│;
                                            ╰─ ─ ─ ─╯
          }
```

FIG. 4A

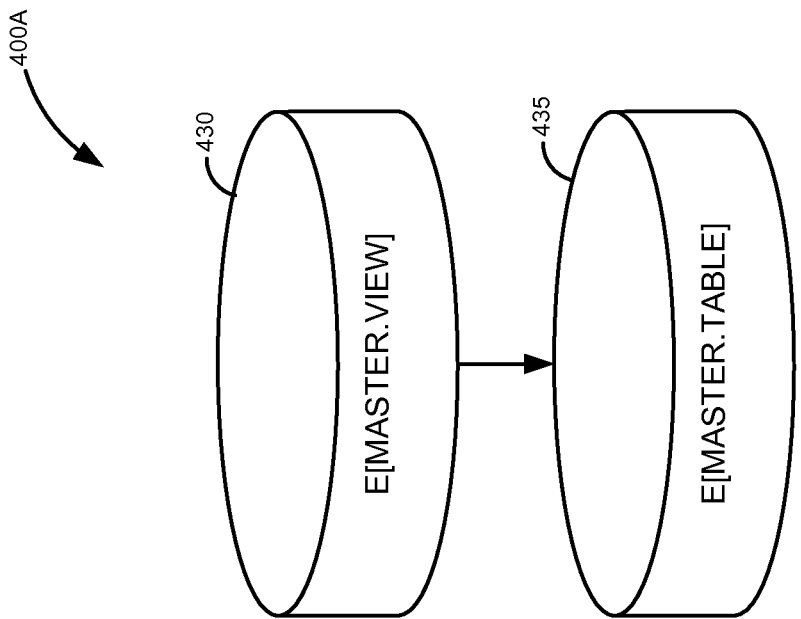
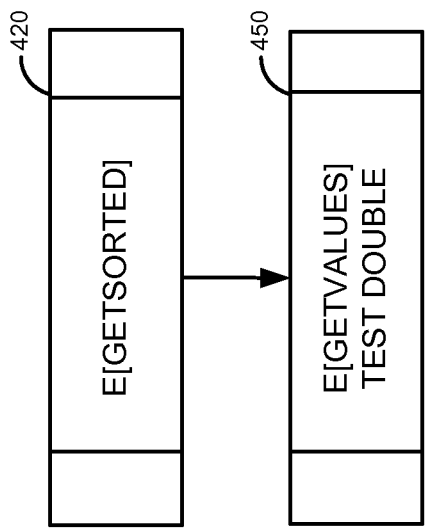
FIG. 4C

```
procedure getSorted ( out sortedValues ) {
  getValues( out values := values );
  for (value:values) {
    for (i:= 0;i++;i<sortedValues.length) {
      if (value > sortedValues.getAtIndex(i)) {
        sortedValues.insertAtIndex(i);
        exit;
      }
    }
    if (!sortedValues.contains(value)) sortedValues.append(value);
  }
} procedure getValues ( out values ) {              ┌─ 455
  values :=
  {
    { name_Column := 'SAMPLE_RECORD_1' date_Column := '2014.06.01' },
    { name_Column := 'SAMPLE_RECORD_2' date_Column := '2014.08.12' },
  };
}
```

FIG. 4D

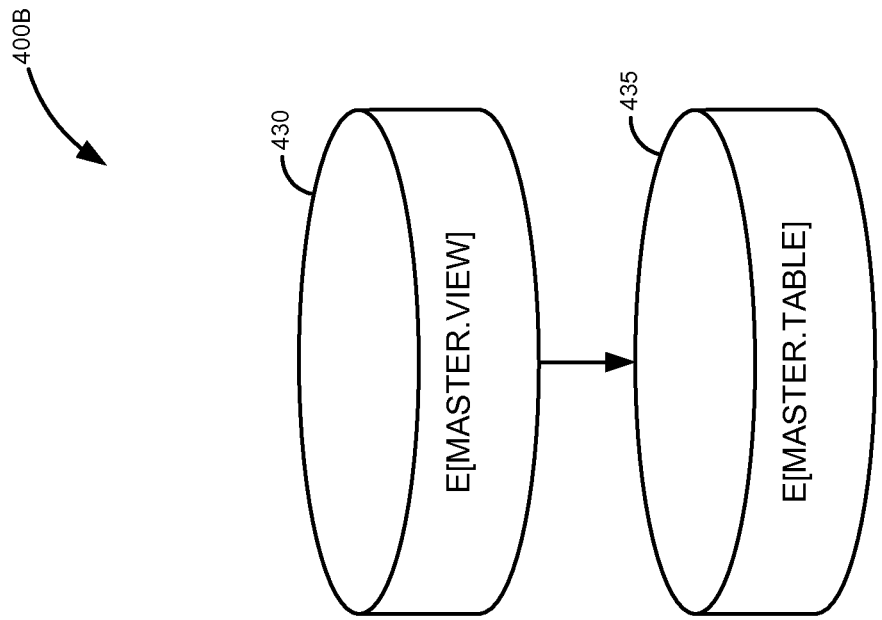
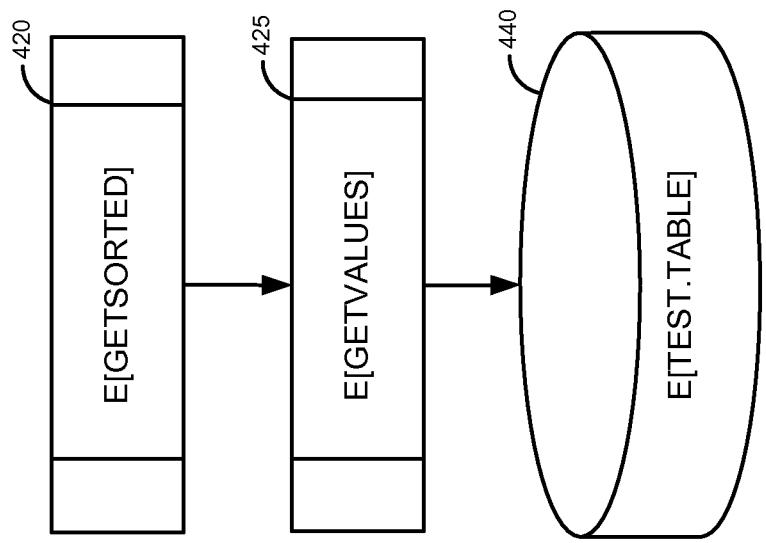
FIG. 4E

```
procedure getSorted ( out sortedValues ) { getValues( out values := values );

for (value:values) { for (i:= 0;i++;i<sortedValues.length) { if (value > sortedValues.getAtIndex(i)) { sortedValues.insertAtIndex(i);

exit;

}

} if (!sortedValues.contains(value)) sortedValues.append(value);

}

}
procedure getValues ( out values ) {      ⎡─ 445 values := select * from ⎡"Test.Table"; ⎤

```
procedure TC1.getSorted ( out sortedValues ) {        ⌒505
    TC1.getValues( out values := values );            ⌒510
    for (value:values) {
        for (i:= 0;i++;i<sortedValues.length) {
            if (value > sortedValues.getAtIndex(i)) {
                sortedValues.insertAtIndex(i);
                exit;
            }
        }
        if (!sortedValues.contains(value)) sortedValues.append(value);
    }
}
procedure TC1.getValues ( out values ) {              ⌒515
    values := select * from "Test.Table";
}
```

FIG. 5

FRAMEWORK FOR TESTING LOGIC OF CODE BASED ON MODEL ELEMENTS

BACKGROUND

Code of software is tested in a software development process to improve quality and robustness of the software. The software is commonly tested by providing various types of input to the software and observing the software's behavior. Unit testing, a software methodology to test portions of the code, ensures the portion of the code is fit for the intended purpose.

Further, the portion of the code that is to be tested may depend on other portions of the code. Dependencies on the other portions (e.g., objects or function modules) may cause testing failures due to, for example, bugs in the objects or function modules themselves. Also, dependencies on a database table may cause testing problems due to, for example, unexpected data (e.g., due to creating new data, modification or deletion of existing data in real time) in the database table, and thus the data in the database table may not be stable for testing. In some cases, there may be no write permissions for the database table, e.g. if the database is replicated from another system, typically only the replication process itself has write permissions. This is to prevent data inconsistencies. Further, to execute the code for testing in another system, the test may not be successful if the data the test relies on is not present in the system.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 4A shows exemplary code artefacts to be tested, according to an embodiment.

FIG. 4C is a block diagram illustrating an exemplary test model composed of model elements, according to an embodiment.

FIG. 4D shows exemplary generated new code artefacts based on the test model of FIG. 4C, according to an embodiment.

FIG. 4E is a block diagram illustrating an exemplary test model composed of model elements, according to an embodiment.

FIG. 4F shows exemplary generated new code artefacts based on the test model of FIG. 4E, according to an embodiment.

FIG. 5 shows exemplary code artefacts illustrating adjustment of code artifacts names, according to an embodiment.

DETAILED DESCRIPTION

Embodiments of techniques to provide a framework to test code are described herein. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
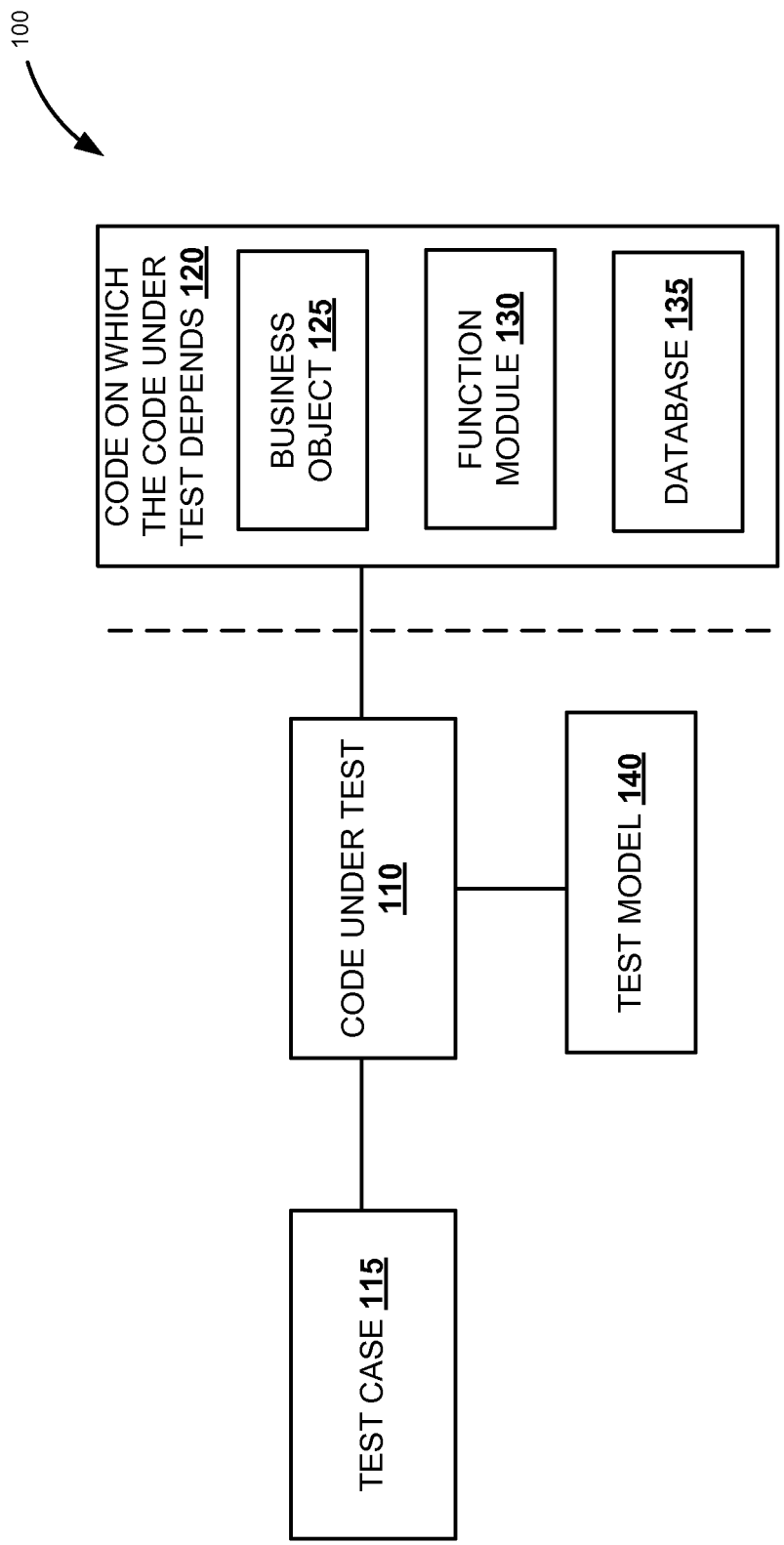
FIG. 1 is a block diagram illustrating, at a high-level, a testing framework, according to an embodiment.

FIG. 1 is a block diagram illustrating, at a high-level, testing framework 100, according to an embodiment. The testing framework 100 provides an option to test a portion of code, which can also be referred as code under test (CUT) 110 or code artefacts to be tested. In unit testing, code is segregated to one or more portions, referred as smallest testable portions of a software application. Further, each of the portions is tested individually. In object oriented programming, a method or a class can be considered as the portion. In procedural programming, a single function can be considered as the portion. In one embodiment, the code can be, but not limited to source code (e.g., view artefacts, procedure artefacts, table artefacts, class artefacts and the like), byte code (i.e., portable code, form of instruction set designed for efficient execution) and meta data.

During testing, for example in test case 115, the CUT 110 is exercised and examined to determine a certain result or behavior. For example, the test case 115 may check that a method "add( )" returns 4 for the operands 3 and 1. Further, the CUT 110 invokes other portions of the code or relies on data sources. Such dependencies are referred as code on which the CUT depends 120. The code on which the CUT depends 120 can be, but not limited to code artefacts relying on business object 125, function module 130 and database 135.

In one embodiment, the CUT 110 is isolated from the code on which the CUT depends 120, which can be test hindering when the behavior of the code on which the CUT depends or associated data cannot be controlled by the test case 115. For example, a procedure "getSorted( )" calls a procedure "getValues( )" to acquire values. The actual sort takes place and finally the sorted values are returned. Consider the procedure "getSorted( )" as the CUT 110. The test case 115 has no control over the behavior of the procedure "getValues( )" and therefore it may not be possible to validate the correctness of the procedure "getSorted( )" Thereby, in order to achieve stable unit tests, it is required to isolate the CUT 110 from the test hindering code on which the CUT depends 120.

In one embodiment, test model 140 composed of model elements representing at least one of the CUT 110, the code on which the CUT depends 120 and preexisting test doubles is generated at the testing framework. Further, an option is provided to define test doubles elements corresponding to the code on which the CUT depends. Furthermore, an option to alter dependencies between the model elements representing the CUT 110, the code on which the CUT depends 120 and the preexisting test doubles, and the defined test double elements in the test model 140 is provided. Next, new code artefacts based on the test model 140 are generated and the generated new code artefacts are executed to test the logic of the CUT 110 in the test case 115. The orchestration of the code on which the CUT depends 120 can be referred as dependency management. Thereby dependency management can be achieved by generating a copy of the CUT 110 to alter code of the CUT 110 and the code on which the CUT depends 120. The altered code, which is referred as the new code artefacts, representing the original program logic of the CUT 110 is used to test the logic of the CUT 110. The generation of the new code artefacts is described in greater detail in FIG. 2.

Figure 2:
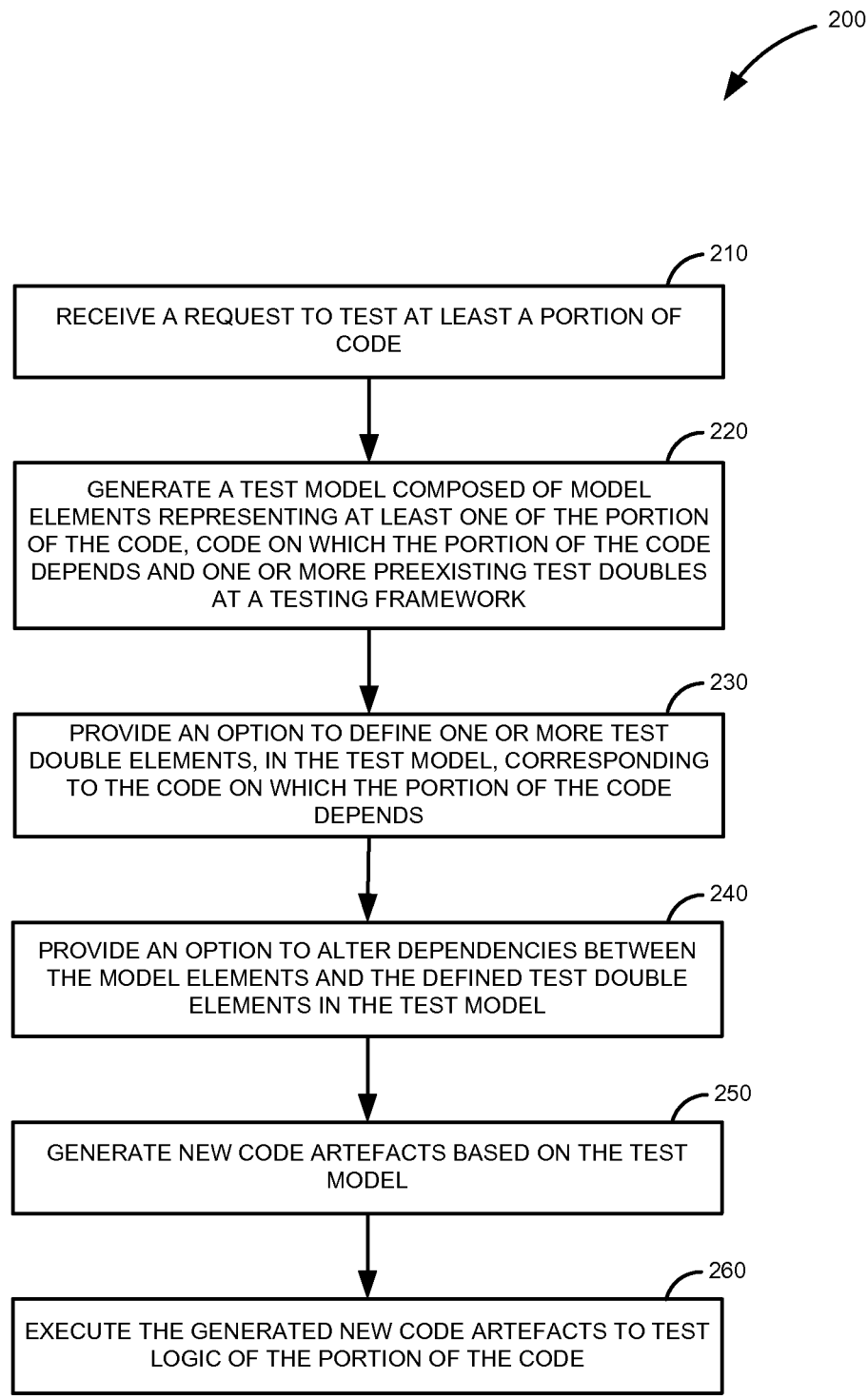
FIG. 2 is a flow diagram illustrating a process to generate new code artefacts to test logic of a portion of code, according to an embodiment.

FIG. 2 is a flow diagram illustrating process 200 to generate new code artefacts to test logic of a portion of code, according to an embodiment. The process 200 depicts a test isolation technique used to test logic of at least a portion of the code by executing generated new code artefacts, which can be testable. The process 200 may include one or more functions or routines in the form of non-transitory computer-executable instructions that are stored in a tangible computer-readable storage medium and executed using a processor of a computing device.

Figure 3:
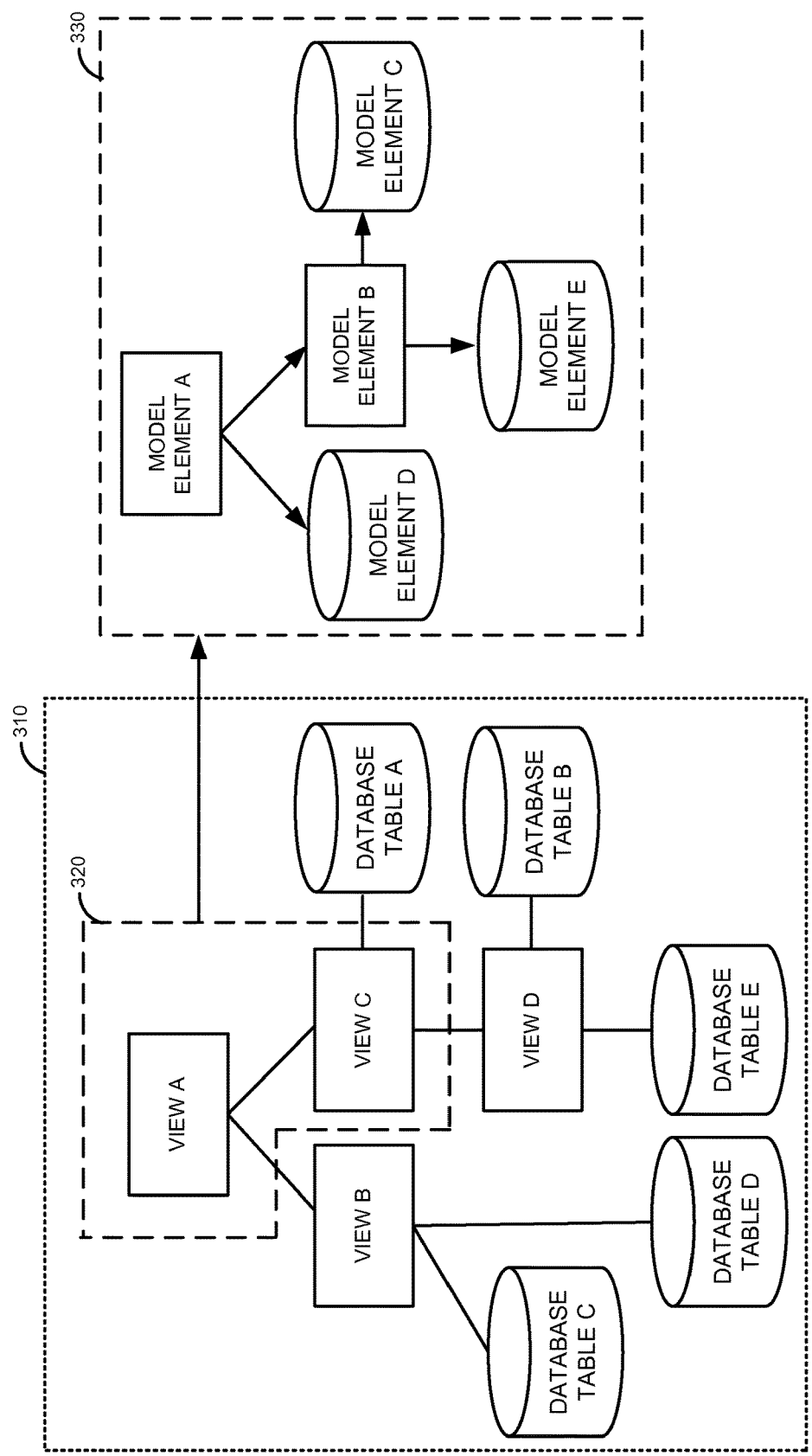
FIG. 3 is an exemplary block diagram illustrating FIG. 2 with an example, according to one embodiment.

At 210, a request to test the portion of the code or code artefacts to be tested is received. FIG. 3 is an exemplary block diagram illustrating FIG. 2 with an example, according to one embodiment. For example, source code 310 includes views (e.g., view A, view B, view C and view D) and database tables (e.g., database table A, database table B, database table C, database table D and database table E), modeled for a software application using the SAP HANA® studio. In one example, the views, procedures and the database tables are referred as portions of the source code. In the example, a request to test portion 320 of the source code 310 is received. The portion 320 includes the view A and the view C and source code which depends on the source code 320. The portion 320 depends directly on the view B, the view D and the database table A. Further, the portion 320 indirectly depends on the database table C and the database table D, on which the view B depends; the database table B and the database table E, on which the view D depends.

At 220 of FIG. 2, a test model composed of model elements representing at least one of the requested portion, code on which the portion of the code depends and preexisting test doubles is generated at the testing framework upon receiving the request to test the portion of the code. In one embodiment, generating the test model includes parsing the portion of the code, identifying the code on which the portion of the code depends directly and indirectly, and generating the test model composed of the model elements representing the portion of the code and the identified code.

In other words, the test model initially includes model elements representing the portion of the code and the code on which the portion of the code depends and also dependencies between the model elements in case the associated code have dependencies. In one exemplary embodiment, the portion of the code and the code on which the portion of the code depends are parsed to determine a reference specifying the dependencies on other portions of the code. Determination of references to the dependencies can be recursive, i.e. if the portion of the code is parsed, and a dependency to another code portion is identified, then the other portion is parsed as well, to determine dependencies to further code portions. From the perspective of the portion of the code, such dependencies are called indirect dependencies. In one exemplary embodiment, recursion depth is not limited logically, i.e. if the portion of the code has indirect dependencies with more than one other code portion in between, then all these dependencies will be determined.

In the example, the test model composed of model elements representing the portion of the code 320 such as the view A and the view C, the code on which the portion depends such as view B, the view D and the database table A are generated. Further, the test model includes model elements representing indirect dependencies such as the database table C, the database table D, the database table E and the database table B.

In one embodiment, the preexisting test double may be preexisting code artefacts fulfill the same service contract of the code on which the portion of the code depends. For example, the preexisting test double is a test table A having same structure and logic of the database table A. Further, a model element representing the test table A is included in the test model.

In one embodiment, the model elements of the test model include business logic and structure of the portion of the code and the code on which the portion of the code depends. In one example, a procedure artefact may get converted into a single procedure model element. In another example, a class artefact may get converted into multiple method model elements. The test model is a simplified representation of the portion of the code and the code on which the portion of the code depends, which helps to analyze and manage dependencies.

Further, the model elements expose services and optionally consume the services. A model element that consumes the service of another model element depends on the other model element. A dependency describes a service contract between the model element that consumes the service and the model element that provides the service. In one exemplary embodiment, the model element includes, but not limited to a unique name or identity, a description which service it offers and a list of services it depends directly on.

At 230, an option is provided to define test double elements in the test model corresponding to the code on which the portion of the code depends. The test double elements defined in the test model may be referred as model defined test double elements. In one embodiment, the model defined test double elements fulfill a service contract of the code associated with the model elements and include a test friendly behavior. Further, depending on the service contract and defined test friendly behavior, code artefacts associated with the model defined test double elements can be one of, but not limited to, a test table artefact with prebuilt records, fulfilling the same service contract as a view artefact or a table artefact, and artefacts representing a test stub object, a dummy object, a mock object, a test spy object, a fake object and the like.

The test table artefact can be stored in a repository, where data or records can be inserted or modified. Thereby, the data in the original database table is not disturbed. The test stub object is used for providing the portion of the code which has to be tested, with indirect input. In other words, the test stub object is a code artefact that acts as temporary replacement for a called procedure and gives the same output as the actual portion of the code. The dummy object is used when a parameter is needed for the tested method but without actually needing to use the parameter. In other words, by substituting a dependency in the copy of the portion with a dummy object, no result will be returned. The mock object is used for providing specific output depending on the input. So in contrast to the stub object, the response of the mock object is not always the same, but depending on the input. The test spy object is used for verifying indirect output of the tested code artefact, by asserting the expectations afterwards, without having defined the expectations before the tested code artefact is executed. The fake object is used as a simpler implementation. For example, using an in-memory database in the tests instead of doing real database access. Therefore, the model defined test doubles can be substitution for code on which the portion of the code depends, behaving in different ways, by doing nothing (e.g., dummy object) or being intelligent to return test data when executed, while preserving logic and structure of the portion of the code. Further, the model defined test double elements are simplified versions of the code on which the portion of the code depends, which reduce the complexity and facilitate testing.

In the example of FIG. 3, the test double elements representing the code on which the portion of the code 320 depends are defined. A test table B representing the view B, the database table C and the database table D on which the view A is dependent is defined. Further, a test table C representing the view D, the database table E and the database table B on which the view D is dependent is defined. Thereby, the test model includes model elements representing the view A, the view B, the view C, the view D, the database table A, the database table B, the database table C, the database table D, the database table E, preexisting test table A, and the test double elements representing the view B and the view D.

At 240 of FIG. 2, an option is provided to alter dependencies between the model elements and the defined test double elements in the test model. In the example of FIG. 3, test model 330 is composed of a model element A representing the view A and a model element B representing the view B. Further, the view B, which in turn depends on the database table C and the database table D is substituted with the model defined test double element representing a test table B (e.g., model element D); the view D, which in turn depends on the database table B and the database table E is substituted with the model defined test double element representing a test table C (e.g., model element E); and the dependent database table A is substituted with a test table A (e.g., model element C). The arrows between the model elements show the dependencies in the test model 330.

In one exemplary embodiment, some or all identified dependencies can be altered. For example in unit testing, sets of one or more computer program modules together with associated control data, usage procedures, and operating procedures are tested. Further, direct dependencies to other views or database tables exist. Each of the direct dependencies to other views or database tables can be substituted by code associated with the model defined test doubles, which fulfill the service contract of the original model elements and associated artefacts. In integration testing, a phase in software testing in which individual software modules are combined and tested as a group, there may not be a need to alter direct dependencies, but rather the view under test depending on another view, and this other view has a dependency to a database table or yet another view that may be altered.

At 250 of FIG. 2, one or more new code artefacts are generated based on the test model. The new code artefacts are modified portion or the clone portion of the portion of the code, which can be testable. Also, the generated new code artefacts based on the test model include same logic as of the portion of the code to be tested. In the example, the new code artefacts are generated based on the test model 330.

At 260, the generated new code artefacts are executed to test logic of the requested portion of the code. In other words, the generated new code artefacts are exposed as the portion of the code for testing. Further, it is advantageous that the described process may not impact an execution time of a domain code and is applicable to any runtime environment without dedicated integration or impact to runtime optimizations.

FIG. 4A shows exemplary code artefacts to be tested, according to an embodiment. For example, a database management system (DBMS) may offer table artefacts, view artefacts and procedure artefacts to store data and to provide application logic. In one example, the table artefacts are data containers; the view artefacts are queries on tables or views; the procedure artefacts call others procedures or access content of the tables and the views.

The code artefacts are also referred as portion of the code to be tested, depicted in FIG. 4A, include a table artefact with no dependencies; a view artefact that may depend on the views and the tables; a procedure artefact that may depend on the procedures, tables or views. In other words, the code artefacts depicted in FIG. 4A include procedure "getSorted( )" 405 invoking the procedure "getValues( )" 410. The procedure "getValues( )" 410 queries view "Master.View" 415. Further, the view "Master.View" 415 queries a table "Master.Table." In one embodiment, a test model corresponding to the code artefacts and code on which the code artefacts to be tested depends, is generated.

Figure 4B:
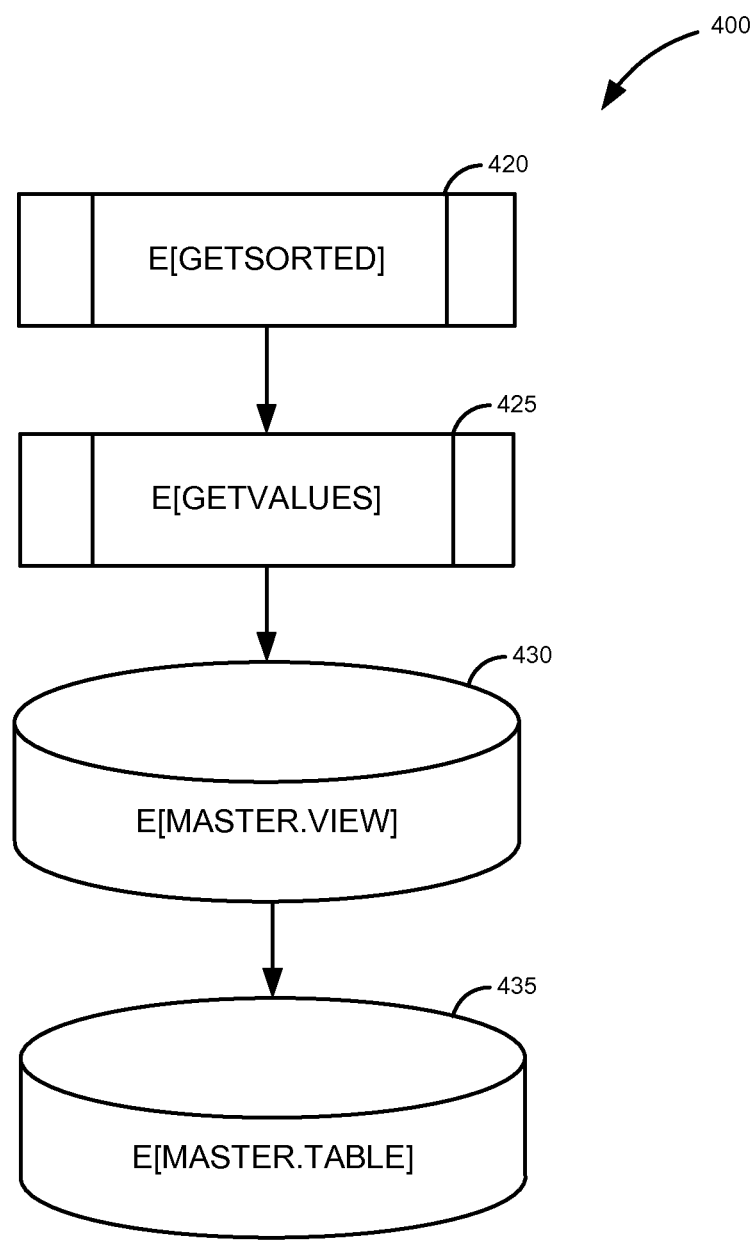
FIG. 4B is block diagram illustrating an exemplary test model composed of model elements, according to an embodiment.

FIG. 4B is a block diagram illustrating exemplary test model 400 composed of model elements (e.g., 420, 425, 430 and 435) corresponding to the code artefacts of FIG. 4A, according to an embodiment. The test model 400 is composed of four model elements E[getSorted] 420, E[getValues( )] 425, E[Master.View] 430 and E[Master.Table] 435. The procedure model element E[getSorted] 420 offers the service 'procedure that returns a sorted record set' and depends on a service 'procedure that returns a record set' offered by the procedure model element E[getValues] 425. Further, the procedure model element E[getValues] 425 offers the service 'procedure that returns a record set' and depends on a service 'data source with structure "Master.View" offered by the view model element E[Master.View] 430.

The view model element E[Master.View] 430 offers a service 'data Source with structure Master.View' and depends on a service 'data source with structure Master.Table' offered by the table model element E[Master.Table] 435. The model elements that use a service of another model element themselves have a direct dependency to the used model element. The dependency is represented in the graph by an arrow from the depending model element to the model element on which it depends. Further, the dependencies are transitive; i.e. a model element X has an indirect dependency to a model element Z if X directly depends on model element Y and Y directly depends on Z. The "distance" of an indirect dependency is not limited, i.e. X also has an indirect dependency on Z if X directly depends on Y, but Y in turn only indirectly depends on Z. In the example, the E[getSorted] 420 has a direct dependency to E[getValues] 425 and an indirect dependency to E[Master.View] 430 and E[Master.Table] 435.

FIG. 4C is a block diagram illustrating exemplary test model 400A composed of model elements, according to an embodiment. In the test model 400A, it is possible to alter dependency between the model elements in the test model 400 of FIG. 4B. With such an alteration, a test hindering code on which the code to be tested depends can be replaced by a test friendly alternative. The test model 400A includes a procedure model element E[getSorted] 420 and a preexisting test double model element (e.g., E [getValues] test double) representing preexisting code artefact, which includes same structure and logic of the procedure model element E[getValues] 425 of FIG. 4B.

In the test model 400A, the dependencies between the model elements depicted in FIG. 4B are altered, where the dependency on the procedure model element E[getValues] 425 of FIG. 4B by the procedure model element E[getSorted] 420 is altered to replace the procedure model element E[getValues] 425 by the preexisting test double model element (e.g., E[getValues] test double).

For example, a procedure artefact offers an operation to specify fixed values for the returned parameters. The procedure "getValues( )" 410 of FIG. 4A offers the service 'procedure that returns a record set.' The original behavior includes a dependency to a database table. The fixed value set fulfills the service contract of the procedure artefact and also removes the dependency to the database artefact. Further, the operation 'return fixed values' converted the model element E[getValues] 425 to on the preexisting test double element (e.g., E[getValues] Test Double 450) with no dependencies. Accordingly in the test model 400A, the model element E[getSorted] 420 no longer contains the dependency on the model element E[Master.View] 430.

FIG. 4D shows exemplary generated new code artefacts based on the test model 400A depicted in FIG. 4C, according to an embodiment. The test model 400A with the altered dependency can be generated back to a form of one or more code artefacts. In one embodiment, the code artefacts are not stored as override of original artefacts but stored as discrete artefacts. The code artefacts of the test model 400A include artefacts corresponding to a preexisting test double element (e.g., E[getValues] test double 450 of FIG. 4C). Further, the generated code artefacts are executed to test the logic of the code to be tested. Thereby, test case authors can use the built-in functionality in order to fully specify which code on which the code to be tested depends be replaced in the code to be tested and how the replaced code behave.

FIG. 4E is a block diagram illustrating exemplary test model 400B composed of model elements, according to an embodiment. In the test model 400B, it is possible to alter dependencies between the model elements in the test model 400 of FIG. 4B. In other words, code artifacts associated with one model element are replaced with code artefacts of another model element that fulfills the service contract. With such an alteration, a test hindering code on which the code to be tested depends can be replaced by a test friendly alternative. For example the "Master.View" table has content that is unknown to a test case and is not desirable to alter the content for test purposes. In such a scenario, a test table "Test.Table" with same structure as of the "Master.View" (fulfilling the service contract of the "Master.View") is considered. Thereby, both the test table "Test.Table" and the view "Master.View" offer the equivalent service 'data source with structure "Master.View." In the example scenario, the direct dependency of a procedure model element E[getValues] 425 from a view model element E[Master.View] 430 is altered to a table model element E[Test.Table] 440.

Depending on the technology, the test model 400B provides an option to define test double elements corresponding to code on which the code to be tested depends. Such defined test double elements may be referred as model defined test double, which fulfills a service contract of a model element corresponding to the code on which the code to be tested depends. Further, dependency from the model element corresponding to the code on which the code to be tested depends are replaced with the model defined test double.

FIG. 4F shows exemplary generated new code artefacts based on the test model 400B depicted in FIG. 4E, according to an embodiment. The test model 400B with the altered dependency can be generated back to a form of code artefacts. In one embodiment, the new code artefacts are not stored as override of the original code artefacts but stored as discrete artefacts in a repository. In one example, the new code artefacts are altered portion of code to be tested. For example, the test model including altered dependencies may get translated to the code artefacts of FIG. 4F. The code artefacts of FIG. 4F include a different indirect dependency to the table "Test.Table" 445. In contrast to the original dependency to the view "Master.View" (e.g., "Master.View" 415 of FIG. 4A), the content of the table "Test.Table" 445 can be controlled by the test case. For instance, the test case can populate the table ("Test.Table" 445) content as required. Thereby, redirecting dependencies enables test cases to replace test unfriendly code on which the code to be tested depends with test friendly substitutes on a test model level.

In one embodiment, depending on the technology, distinct types of code artefacts may fulfill equivalent services. A model defined test double element can be mapped to any artefact type that provides an equivalent service compared to the original artefacts. For example, a database management system (DBMS) provides view artefacts and table artefacts. The service contract 'provide data' can be offered by a view artefact and also a table artefact as long their structures are equivalent. In such a scenario, a test table artefact can be used to replace the view artefact by the model defined test double element.

In one exemplary embodiment, the test model is represented by a graph of model elements. Further, the dependency altered model elements in the graph require a code generation. In case the model elements and the associated code artefacts have a cardinality of 1:1 for each modified model element, one code artefact needs to be generated. In case several model elements represent parts of one code artefact, code artefacts are generated if one or more of its partial model elements are altered. For example, a class artefact modelled by method artefact needs to be generated if at least one method artefact has been modified.

Further, the generated new code artefacts of the test model may not override the original code. Therefore, it is necessary to store the generated new code artefacts as discrete artefacts in a repository. In one exemplary embodiment, it is possible to store the generated new code artefacts with a same name or identity in a separate physical container or repository. In other exemplary embodiment, the generated new code artefacts are stored with a different name in the same repository as of the original code artefacts.

For example in Microsoft® Windows™ C++ like programming languages, classes may be grouped in a shared library called dynamic link library (DLL). The DLL may have different versions or implementations. The new code artefacts can be stored in a different version of the DLL without overriding the original code artefact. Therefore, the new code artefacts generated based on the test model of the code to be tested may not necessarily require different names.

For example in the ABAP programming language, there are no libraries. Class artefacts coexist in a single repository. Also, the name of a class or procedure artefact needs to be unique. In such a scenario, storing the altered code does not use the name of the original artefact. Storing the altered generated code requires to use a different name or identity for the artefact.

Therefore, depending on the technology, unique names for artefacts that require code generation are needed. In another exemplary embodiment, the alternate name can be a postfix to an original name or a prefix to the original name. In yet another exemplary embodiment, names are randomly generated. For example, in Java the full name of classes consists of the concatenated package and class name; a class named "package1.MyClass" can be renamed to "package2.MyClass." References by name to the artefacts may be required to use the alternate name. Applying new names to code artefacts and updating the references can be referred as adjustment of code artefact names. Any reference in the code of other model elements is required to refer to the new names. In such a scenario, the need for name adjustment is transitive. In other words, the code artefacts may require all artefacts, that have a direct or indirect reference, to be generated too; and thus to introduce a new name.

FIG. 5 shows exemplary code artefacts illustrating adjustment of code artefact names, according to an embodiment. A model element E[getValues] has been modified on test model level. Therefore, the procedure name "getValues( )" gets adjusted because of its changed dependency on artefact level. A model element E[getSorted] depends on the model element E[getValues]. Therefore, the procedure name "getSorted( )" gets adjusted because of its changed dependency on artefact level. In this example, adjusted names have the prefix "TC1" (e.g., 505, 510 and 515).

In one embodiment, the code artefacts or modified code includes the same logic or behavior as of a portion of code to be tested or CUT. Therefore, it is possible to exercise the logic of the code artefacts. The code artefacts get accessed by the test case in order to exercise the program logic of the CUT. Further, Depending on the technology, the code artefacts can be exercised or executed by the test case. For example, the test case may invoke the code artefacts by the names.

Figure 6:
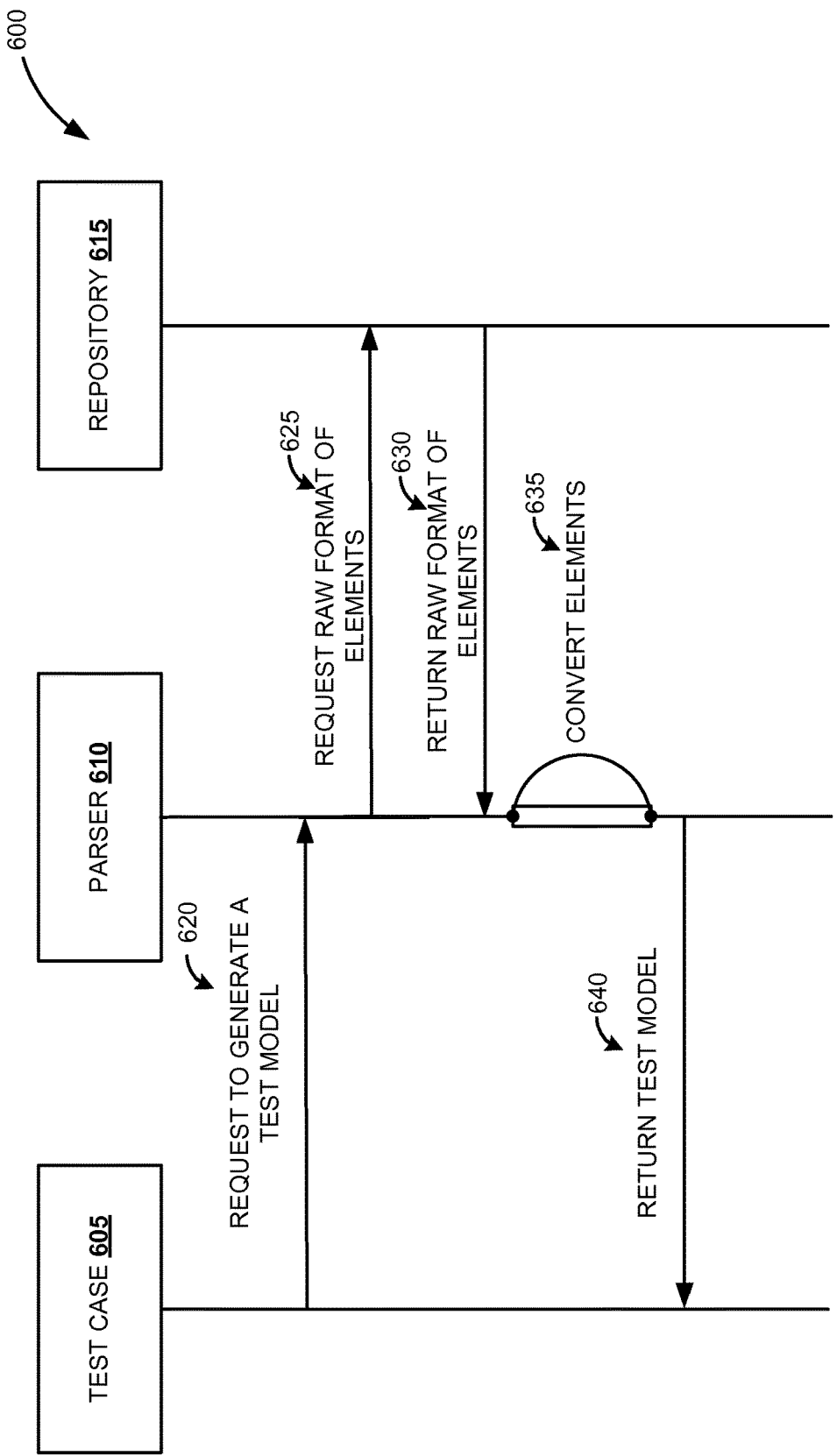
FIG. 6 is a sequence diagram illustrating an exemplary data flow for generating a test model in a testing framework, according to an embodiment.

FIG. 6 is a sequence diagram illustrating exemplary data flow 600 for generating a test model in a testing framework, according to an embodiment. The testing framework includes modules such as test execution module of executable instructions. For purposes of illustration, the test execution module is described as performing actions that the computers of the testing framework perform when executing instructions of the test execution module. In one embodiment, the testing framework includes modules such as a parser, a serializer and a repository to generate a test model.

The sequence diagram 600 represents the interactions and the operations involved in the method to generate the test model. FIG. 6 illustrates process objects including test case 605, parser 610 and repository 615 along with their respective vertical lines originating from them. The vertical lines of the test case 605, the parser 610 and the repository 615 represent the processes that may exist simultaneously. The horizontal lines (e.g., 620, 625, 630 and 640) represent execution of the method between the vertical lines originating from their respective process objects (e.g., the test case 605, the parser 610 and the repository 615). Activation box 635 represents the steps that are being performed in the parser 610.

In one embodiment, the test model is generated using the parser 610. At 620, the test case 605 requests the parser 610 to generate the test model of a portion of code to be tested. Further, the parser 610 requests raw format of the code artefacts and associated dependencies from the repository 615 at 625. In response to the received request, the repository 615 returns the raw format and the other requested information to the parser 610. At 635, the parser 610 converts the raw format into model elements, thus generating the test model. Further, the parser 610 returns the generated test model to the test case 605. For example, the test case 605 may access the test model as shown in following code:

```
testCase getModel {
    Parser.parseArtefact(
    in rootArtefact := "procedure:getSorted"
    out model     := model);
}
```

For example, the test case 605 invokes the parser 610 with the name including the type of the model element. The parser 610 returns the test model with a graph as shown in FIG. 4B. In one embodiment, the test case 605 can request the test model from the parser 610 by supplying a description of the portion of the code converted into the test model. For example, the description can be identity or name of a model element or a piece list.

Figure 7:
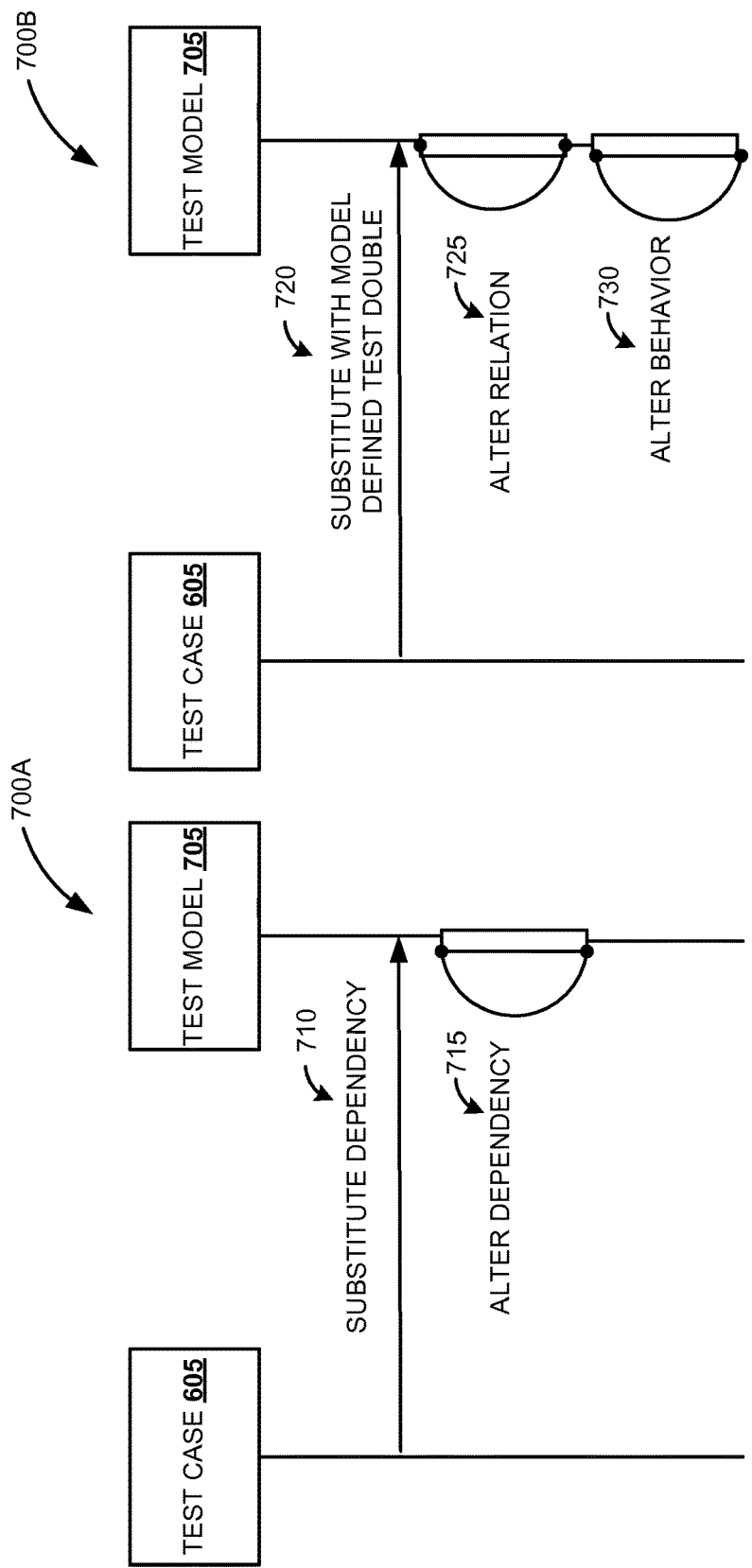
FIG. 7A is a sequence diagram illustrating an exemplary data flow for altering dependencies in a test model, according to an embodiment.
FIG. 7B is a sequence diagram illustrating an exemplary data flow for altering dependencies in a test model, according to an embodiment.

FIG. 7A is a sequence diagram illustrating exemplary data flow 700A for altering dependencies in a test model, according to an embodiment. The data flow 700A represents the interactions and the operations involved in the method to substitute dependencies in the test model. FIG. 7A illustrates process objects including test case 605 and test model 705 along with their respective vertical lines originating from them. The vertical lines of the test case 605 and the test model 705 represent the processes that may exist simultaneously. The horizontal line 710 represents execution of the method between the vertical lines originating from the test case 605. Activation box 715 represents the steps that are being performed in the test model 705.

In one embodiment, the test case 605 can redirect dependencies between the model elements in the test model 705. Operations that redirect dependencies ensure as precondition that the involved model elements consume or supply or fulfil the same service contract as of the code to be tested. A redirect operation addresses dependencies within a specific scope or globally within the test model 705.

At 710, the test case 605 requests the test model 705 to substitute or redirect a dependency associated with the portion of the code. Upon receiving the request, the test model 705 validates that the redirection adheres to the inherent constraint that a new model defined test double element or a preexisting test double element (e.g., test table) offers the required service contract and reflect the altered dependency at 715. For example, a test case may redirect a single dependency with following code:

```
testCase redirectDependency {
    Parser.parseArtefact(
```

```
            in rootArtefact := "procedure:getSorted"
            out model      := model);
        model.redirectDependency(
            in element := "procedure:getValues"
                from   := "view:Master.View"
                to     := "table:Test.Table" );
    }
```

The "model.redirectDependency( )" function alters, within a depending model element ("procedure:getValues"), a single dependency ("view:Master.View") to another model element it should depend on ("table:Test.Table"). With the above mentioned code, the test model shown in 4B will be transformed into the graph as shown in FIG. 4E. In another example, the test case 605 redirect the same dependency with following code:

```
testCase redirectDependencies {
    Parser.parseArtefact(
            in rootArtefact := "procedure:getSorted"
            out model      := model);
        model.redirectDependencies(
            in from := "view:Master.View"
                to := "table:Test.Table" );
    }
```

The "model.redirectDependencies( )" function alters any dependency from "view:Master.View" to the "table:Test.Table." With the above mentioned code, the test model shown in 4B is transformed into the graph as shown in FIG. 4E. Thereby the test case can redirect dependencies in the test model by supplying the current depended-on model element and the targeted depended-on model element and the name of the depending model element, for instance.

FIG. 7B is a sequence diagram illustrating exemplary data flow 700B for altering dependencies in a test model, according to an embodiment. The data flow 700B represents the interactions and the operations involved in the method to substitute the model element with the model defined test double in the test model. FIG. 7B illustrates process objects including test case 605 and test model 705 along with their respective vertical lines originating from them. The vertical lines of the test case 605 and the test model 705 represent the processes that may exist simultaneously. The horizontal line 720 represents execution of the method between the vertical lines originating from the test case 605. Activation boxes (e.g., 725 and 730) represent the steps that are being performed in the test model 705.

In one embodiment, the test case 605 can define alternate behavior of the model elements in the test model 705 by altering the model element in the test model 705 with the model defined test double. The model defined test double may offer an application program interface (API) to define alternate behaviour without the necessity of in-depth knowledge of code artefacts.

At 720, the test case 605 requests the test model 705 to substitute the model element in the test model 705 with the model defined test double. At 725, in case the model defined test double include altered dependencies, the test model redirects, adds or removes dependencies of the model element with the model defined test double behavior. Further, the test model keeps a record of the altered behavior by the substitution of the model element with the model defined test double behavior at 730.

The model defined test double element can represent artefacts associated with a stub test double, a dummy test double and the like. For example, the stub test double artefact is a model defined test double element for a method or procedure that returns well defined values. For example, a test case may define stub behavior for a procedure with following code:

```
testCase defineDouble {
    Parser.parseArtefact(
            in rootArtefact := "procedure:getSorted"
            out model       := model);
        model.defineDouble(
            in element := "procedure:getValues"
                kind   := "stub"
                values :=
                {
                        { name_Column := 'SAMPLE_RECORD_1'
                          date_Column := '2014.06.01'},
                        { name_Column := 'SAMPLE_RECORD_2'
                          date_Column := '2014.08.12'},
                } );
    }
```

The "model.defineDouble( )" specifies stub behavior for the model element "procedure:getValues." As stubs return fixed values, the model defined test double element "procedure:getValues" may no longer have any dependencies. For example, with the above mentioned code, the test model depicted in FIG. 4B is modified in to the test model depicted in FIG. 4C. Further, the model element "procedure:getValues" becomes the model defined test double element and remembers the fixed value behavior while storing. Thereby, the test case can define test double behavior on the test model by supplying the name of the model element and its intended behavior and further, the model element is substituted with the model defined test double element.

Figure 8:
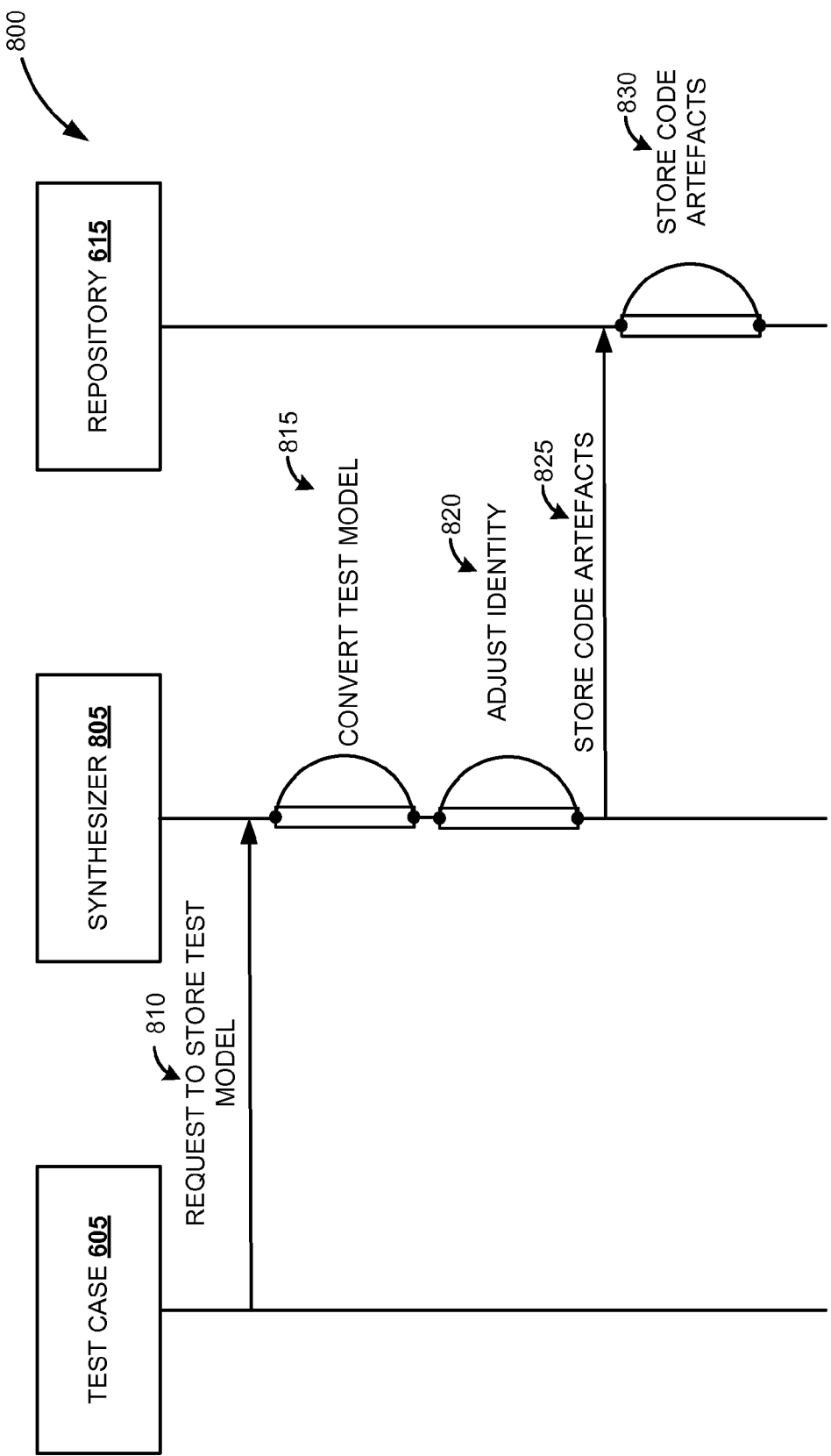
FIG. 8 is a sequence diagram illustrating an exemplary data flow for storing generated new code artefacts based on a test model, according to an embodiment.

FIG. 8 is a sequence diagram illustrating exemplary data flow 800 for storing code artefacts generated based on a test model, according to an embodiment. The data flow 800 represents the interactions and the operations involved in the method to store the code artefacts generated based on the test model. FIG. 8 illustrates process objects including test case 605, synthesizer 805 and repository 615 along with their respective vertical lines originating from them. The vertical lines of the test case 605, synthesizer 805 and repository 615 represent the processes that may exist simultaneously. The horizontal lines (e.g., 810 and 825) represent execution of the method between the vertical lines originating from their respective process objects (e.g., the test case 605, the synthesizer 805 and the repository 615). Activation boxes (e.g., 815, 820 and 830) represent the steps that are being performed in the serializer 805 and the repository 615.

In one embodiment, after the test case 605 has defined model defined test doubles and redirected dependencies, the test case can request the serializer 805 to generate code artefacts corresponding to the test model and store in the repository 615. At 810, the test case 605 requests the serializer 805 to store the code artefact generated based on the test model. At 815, the serializer 805 converts the test model into the code artefact. Further, the serializer 805 adjusts identity or names of the code artefact, if required at 820. At 825, the serializer 805 requests the repository 615 to store the code artefacts corresponding to the test model. At 830, the repository 615 performs the action of storing the code artefact. For example a test case may read, alter and store the test model with following code:

```
testCase redirectDependenciesToServiceComplete {
    Parser.parseArtefact(
            in rootArtefact := "procedure:getSorted"
```

-continued

```
        out model    := model);
    model.redirectDependenciesToService(
        in from    := "view:Master.View"
             to    := "table:Test.Table" );
    Serializer.storeModel(
        in model   := model
        out rootArtefact := clonedArtefact );
}
```

The "Serializer.storeModel" function stores code artefacts in the dependency graph of the model element "procedure: getSorted." Storing the test model in the repository triggers the code artefact generation and if required an adjustment of names. Further, the code artefacts corresponding to the test model gets persisted in the repository, which can be accessed for performing testing.

In one embodiment, the method described in FIG. 2 can be implemented in testing tools for performing unit testing. For example, the method can be implemented in SAP® HANA platform and in ABAP embedding Database management systems (DBMS) code. SAP HANA is an in-memory database allowing high-performance processing and analysis of data on the database and prevents the necessity to transfer data from the database to an application server. Further, the in-memory database allows modeling data as tables and views. Tables are tabular data structures, each row identifying a particular entity, and each column having a unique name. Further, views are combinations and selections of data from tables modeled to serve a particular business purpose. And, the views or procedures include hard wired dependencies to other procedures and database tables to make best use of optimization and parallelization.

Further, the SAP HANA studio is a development tool of SAP HANA. The SAP HANA studio also referred to as SAP HANA modeler is a graphical data modeling tool which allows designing analytical models and analytical privileges that govern the access to those models. The information model designing process in the SAP HANA modeler involves building content data for generating information models. The content data is a schema that defines the relevant tables and relationships from one or more relational databases. Further, the SAP HANA studio information modeler allows creating new or modifying existing information models. These models are called 'information models' and they are also interchangeably referred to as 'column views', 'HANA views', 'HANA models' or 'HANA cubes'. In one exemplary embodiment, different types of information views of the information models can be generated. For example, the information view can be an attribute view, an analytic view and a calculation view.

Figure 9:
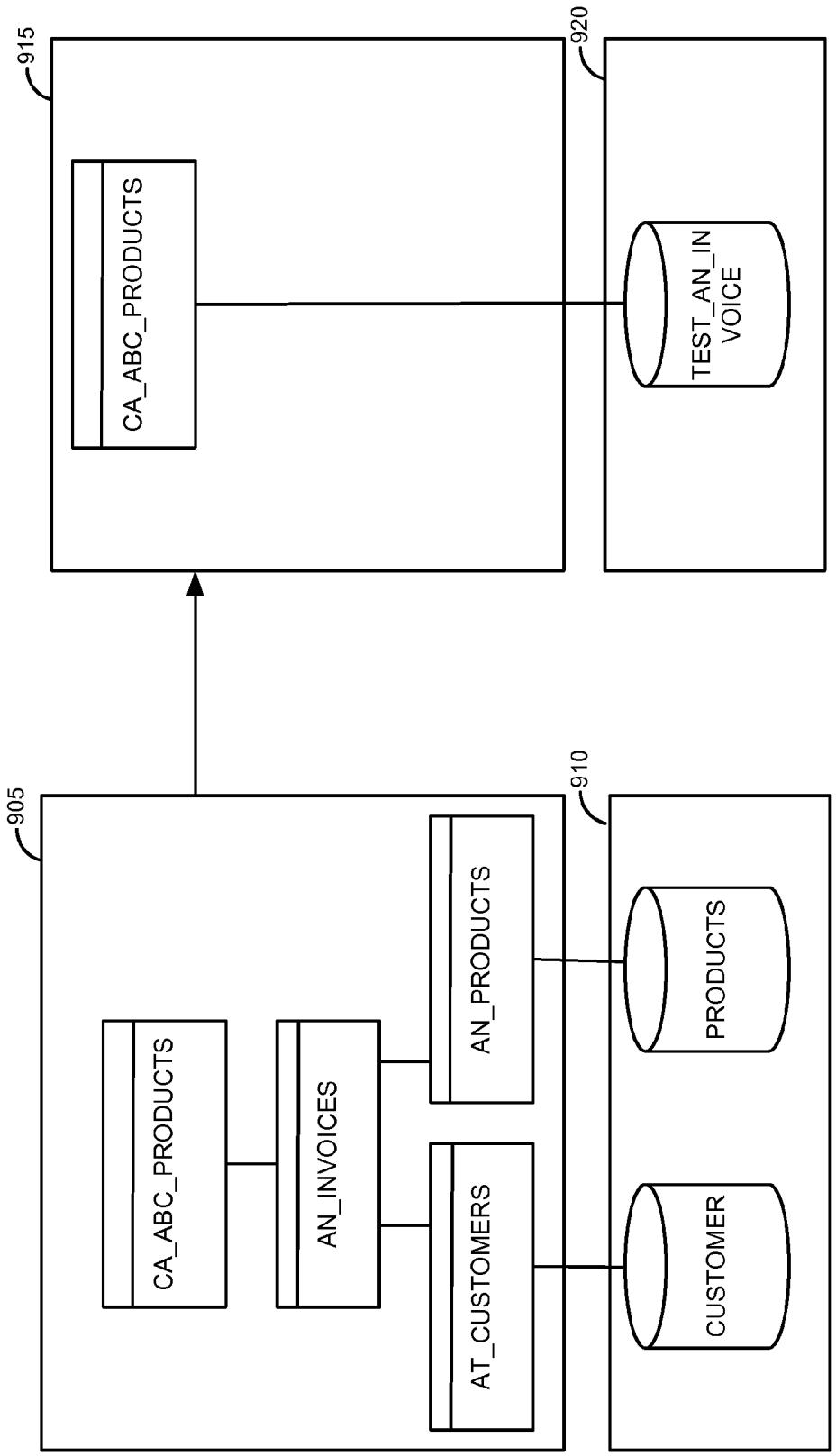
FIG. 9 is a block diagram illustrating FIG. 2 with an example on a SAP HANA® platform, according to an embodiment.

FIG. 9 is a block diagram illustrating FIG. 2 with an example on a SAP HANA® platform, according to an embodiment. For example, calculation view "CA_ABC_PRODUCTS", and dependencies (e.g., both direct and indirect dependencies) of the calculation view "CA_ABC_PRODUCTS" on the SAP HANA® platform is shown in FIG. 9. Further, the HANA catalog objects (e.g., "CA_ABC_PRODUCTS", "AN_INVOICES", "AT_CUSTOMERS" and "AT_PRODUCTS") are located in a productive package, for instance 905. The calculation view "CA_ABC_PRODUCTS" (e.g., in 905) depends directly and indirectly on different modelled views. The calculation view "CA_ABC_PRODUCTS" depends on "AN_INVOICES." The "AN_INVOICES", is the analytic view which combines the attribute data from attribute views "AT_CUSTOMERS" and "AT_PRODUCTS." Further, the attribute views model relationship between the attribute data contained in source tables 910 (e.g., "CUSTOMERS" and "PRODUCTS"). The source tables 910 serve as data foundation and are located in the productive schema or package (e.g., 905) and cannot be modified, as they are replicated from another system.

In one embodiment, HANA object is tested by generating a test model corresponding to the HANA object. Further, the dependencies associated with the HANA object are substituted. For example, in order to verify the correctness of the "CA_ABC_PRODUCTS", a copy of "CA_ABC_PRODUCTS" is generated, in a test package (e.g., 915).

The parser builds up the test model, which includes hierarchy of HANA object model elements, where the direct dependencies are replaced by a test double (e.g., a test table in test schema 920). Parser retrieves metadata of the different HANA objects to derive model elements and their dependencies from a repository. In one embodiment, the parser determines the model elements that need to be substituted with respect to their direct dependencies and enriches the model elements by that update information. In one aspect, a model element may substitute associated dependency, which may be explicitly defined within the test. For example, the "AN_INVOICES" view is substituted by the test table.

In one embodiment, the test framework supports deep dependency substitution by determining dependencies deep within the HANA Object and replaces even indirect dependencies. Therefore, the test model (e.g., generated HANA object and database artefacts) after the replacement of the code on which the HANA object depends needs to be translated back to code artefact. Thereby, the parser removes the model elements from the test model that remain unchanged as they have no direct or indirect dependency replacement.

In the example, the dependent analytic view "AN_INVOICES" is replaced by the test table "TEST_AN_INVOICE" 920. Thereby, the "CA_ABC_PRODUCTS" in the test package 915 is a cloned version of the "CA_ABC_PRODUCTS" calculation view in the original package 905, where the dependency on the analytic view "AN_INVOICE" is replaced by the test table "TEST_AN_INVOICE" in a test schema 920 as defined by the user. Thereby, the tester needs no longer to analyze the underlying data foundation (e.g., "CUSTOMERS" and "PRODUCTS" in the database schema 910), in order to prepare test data in all the source tables consistently.

In one embodiment, a serializer in the testing framework converts model elements in the test model back to code artefacts, which can be executed for testing. For each code artefact that needs to be cloned the dependency must be adapted. Further, in order to support parallel test execution, each cloned element and each created test double is created in a user-specific database schema or package in order to allow multiple users in parallel to use the artefacts derived from a test model.

In one embodiment, the repository reads the metadata of the original HANA objects like views and stored procedures as well as the metadata of the original database tables, which are used to generate the test model. Further, the repository stores the generated code artefacts (that is cloned elements of the original HANA object). Furthermore, the repository can be accessed via SAP HANA® extended application service (XS) JavaScript API, for instance. Thus, the described method allows testing the HANA object or the code artefacts in isolation by combining copy and replacing paradigm with test double techniques.

Figure 10:
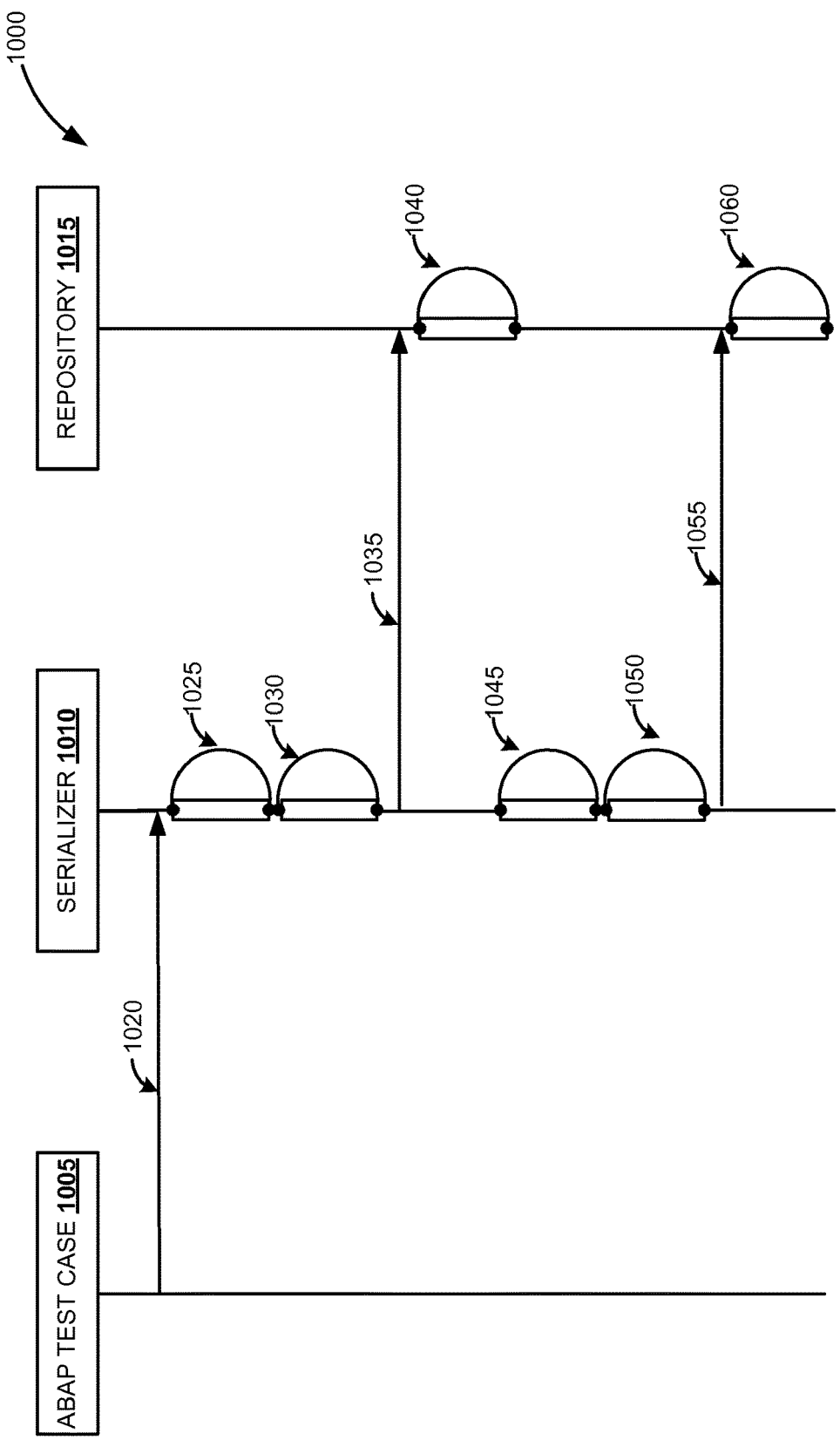
FIG. 10 is a sequence diagram illustrating an exemplary data flow in a testing framework implemented on ABAP embedding DBMS, according to an embodiment.

FIG. 10 is a sequence diagram illustrating an exemplary data flow in a testing framework implemented on ABAP embedding DBMS, according to an embodiment. ABAP is a programming language, which is object oriented and may include breakout scenarios to integrate database procedures into the infrastructure of the ABAP development environment. On a high level picture, the implementation of an ABAP method can be coded in a different language. ABAP programs can invoke such a method similar to a method implemented in ABAP. The method definition serves as proxy into the runtime of another programming language. Subsequent calls from such embedded procedures to further embedded procedures are completely under the control of the runtime of the embedded language.

In the testing framework, a test model includes model elements corresponding to procedures, views and tables. Proxy methods with the embedded procedure are mapped to procedure elements. Database tables are mapped to table elements. Database views are mapped to view elements. Further, dependencies are expressed in the ABAP code by a using clause, and get directly mapped into dependencies in the test model. In one embodiment, dependencies are substituted using name of current code on which the code to be tested depends and the name of its substitute as input and perform the replacement.

In one embodiment, a parser of the testing framework uses an abstract syntax representation of the ABAP source and metadata of tables and views to derive the model elements and their dependencies. Further, upon substitution dependencies, the parser acquires a representation of the embedded code that allows replacing the code on which the code to be tested depends by altering the name thereof.

In one embodiment, a serializer of the testing framework uses distinct producers to create the code for artefacts specific to behaviour of model defined test doubles. For example, a source code composer for stub behaviour (e.g., return fixed values) for procedures. A source code composer for dummy behaviour (e.g., do nothing) for procedures. Meta data composer for database tables with identical structure as the original table or view.

In one embodiment, a repository reads the metadata of the original ABAP classes, the metadata of the original database tables and the name of the original views from a local repository. Further, the repository stores cloned artefacts in the local repository. Further along with the serializer, the repository additionally keeps track of the code artefacts or generated code in a catalogue. The catalogue includes the name of generated code artefacts and a checksum on all relevant attributes. In one exemplary embodiment, before the serializer dices the name for new code artefacts it looks up the repository catalogue and checks for an already generated code artefacts that can be reused by the checksum. In case code artefacts can be reused its name will be used for further on and no new code artefacts will be generated. Only in case no reusable code artefacts exist; a random name gets generated and the new code artefacts will be written to the repository.

The data flow 1000 in FIG. 10 represents the interactions and the operations involved in the testing framework. FIG. 10 illustrates process objects including ABAP test case 1005, serializer 1010 and repository 1015 along with their respective vertical lines originating from them. The vertical lines of the ABAP test case 1005, the serializer 1010 and the repository 1015 represent the processes that may exist simultaneously. The horizontal lines (e.g., 1020, 1035 and 1055) represent execution of the method between the vertical lines originating from their respective process objects (e.g., the ABAP test case 1005, the serializer 1010 and the repository 1015). Activation boxes (e.g., 1025, 1030, 1040, 1045, 1050 and 1060) represent the steps that are being performed in the serializer 1010 and the repository 1015.

At 1020, the ABAP test case 1005 requests the serializer 1010 to store the artefacts associated to a test model. At 1025, the serializer 1010 converts the data model into code artefacts. Also, the serializer computes a hash code for each artefact at 1030. Further, the serializer looks up the name of a possibly existing artefacts with the hashcode at 1035.

At 1040, the repository 1015 returns the name of an existing artefact if applicable or signals that no such code artefact exist. In case an according artefact exists, the serializer 1010 reuses the existing artefact and its name at 1045. Further, in case no according artefact exits, the serializer 1010 adjusts the names of the artefacts if require at 1050. At 1055, the serializer 1010 requests the repository 1015 to store the artefact. The repository performs the actual store operation at 1060.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may correspond to a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 11:
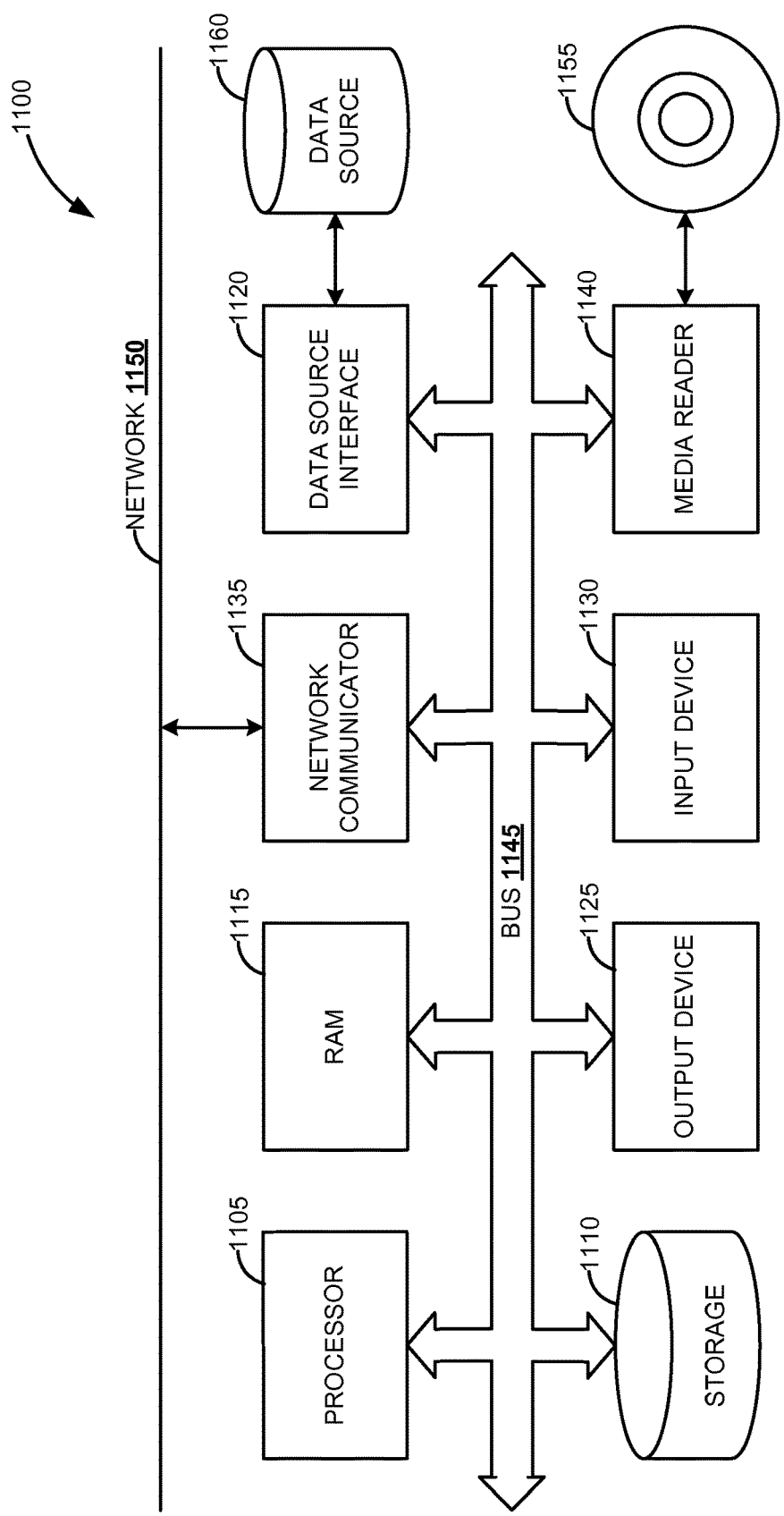
FIG. 11 is a block diagram of an exemplary computer system, according to an embodiment.

FIG. 11 is a block diagram of an exemplary computer system 1100. The computer system 1100 includes a processor 1105 that executes software instructions or code stored on a computer readable storage medium 1155 to perform the above-illustrated methods. The processor 1105 can include a plurality of cores. The computer system 1100 includes a media reader 1140 to read the instructions from the computer readable storage medium 1155 and store the instructions in storage 1110 or in random access memory (RAM) 1115. The storage 1110 provides a large space for keeping static data where at least some instructions could be stored for later execution. According to some embodiments, such as some in-memory computing system embodiments, the RAM 1115 can have sufficient storage capacity to store much of the data required for processing in the RAM 1115 instead of in the storage 1110. In some embodiments, all of the data required for processing may be stored in the RAM 1115. The stored instructions may be further compiled to generate other representations of the instructions and dynamically stored in the RAM 1115. The processor 1105 reads instructions from the RAM 1115 and performs actions as instructed. According to one embodiment, the computer system 1100 further includes an output device 1125 (e.g., a display) to provide at least some of the results of the execution as output including, but not limited to, visual information to users and an input device 1130 to provide a user or another device with means for entering data and/or otherwise interact with the computer system 1100. Each of these output devices 1125 and input devices 1130 could be joined by one or more additional peripherals to further expand the capabilities of the computer system 1100. A network communicator 1135 may be provided to connect the computer system 1100 to a network 1150 and in turn to other devices connected to the network 1150 including other clients, servers, data stores, and interfaces, for instance. The modules of the computer system 1100 are interconnected via a bus 1145. Computer system 1100 includes a data source interface 1120 to access data source 1160. The data source 1160 can be accessed via one or more abstraction layers implemented in hardware or software. For example, the data source 1160 may be accessed by network 1150. In some embodiments the data source 1160 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium storing instructions, which when executed by a computer causes the computer to:
receive a request to test at least a portion of code;
generate a test model, at a testing framework, composed of a first model element representing the portion of the code, and a test double element representing a view on which the portion of the code depends and a database table on which the view depends;
receive a definition of the test double element, in the test model, wherein the defined test double element is a test table artefact including table records and which fulfills a functionality of the view on which the portion of the code depends and the database table on which the view depends;
generate one or more new code artefacts based on the test double element; and
execute the generated one or more new code artefacts to test logic of the portion of the code without overriding original code artefacts of the portion of the code.

2. The non-transitory computer-readable medium of claim 1, wherein the code comprises at least one of source code, byte code and meta data.

3. The non-transitory computer-readable medium of claim 1, wherein generating the test model comprises:
parsing the portion of the code;
identifying the code on which the portion of the code depends directly and indirectly; and
generating the test model composed of the model elements representing the portion of the code and the identified code.

4. The non-transitory computer-readable medium of claim 1, wherein the test double element fulfills the same service contract as the code on which the portion of the code depends.

5. The non-transitory computer-readable medium of claim 1, wherein the defined test double element fulfills a service contract of the code associated with the model elements, and wherein the dependency of the code defines the service contract.

6. The non-transitory computer-readable medium of claim 1, wherein the generated one or more new code artefacts are stored as discrete artefacts in a repository using alternate names comprising one of a postfix to an original name, a prefix to the original name and having a randomly generated name.

7. A computer implemented method to provide a testing framework to test logic of code, the method comprising:
receiving a request to test at least a portion of code;
generating a test model, at the testing framework, composed of a first model element representing the portion of the code, a test double element representing a view on which the portion of the code depends and a database table on which the view depends;
receiving a definition of test double element, in the test model, wherein the defined test double element is a test table artefact including table records and which fulfills a functionality of the view on which the portion of the code depends and the database table on which the view depends;
generating one or more new code artefacts based on the test double element; and
executing the generated one or more new code artefacts to test logic of the portion of the code without overriding original code artefacts of the portion of the code.

8. The computer implemented method of claim 7, wherein the code comprises at least one of source code, byte code and meta data.

9. The computer implemented method of claim 7, wherein generating the test model comprises:
parsing the portion of the code;
identifying the code on which the portion of the code depends directly and indirectly; and
generating the test model composed of the model elements representing the portion of the code and the identified code.

10. The computer implemented method of claim 7, wherein the test double element fulfills the same service contract as the code on which the portion of the code depends.

11. The computer implemented method of claim 7, wherein the defined test double element fulfills a service contract of the code associated with the model elements, and wherein the dependency of the code defines the service contract.

12. The computer implemented method of claim 7, wherein the generated one or more new code artefacts are stored as discrete artefacts in a repository using alternate names comprising one of a postfix to an original name, a prefix to the original name and having a randomly generated name.

13. A computer system to provide a testing framework to test logic of code, the computer system comprising:
at least one processor; and
one or more memory devices communicative with the at least one processor, wherein the one or more memory devices store instructions to:
receive a request to test at least a portion of code;
generate a test model, at the testing framework, composed of a first model element representing the portion of the code, a test double representing a view on which the portion of the code depends and a database table on which the view depends;
receive a definition of the test double element, in the test model, wherein the defined test double element is a test table artefact including table records and which fulfills a functionality of the view on which the portion of the code depends and the database table on which the view depends;
generate one or more new code artefacts based on the test double element; and
execute the generated one or more new code artefacts to test logic of the portion of the code without overriding original code artefacts of the portion of the code.

14. The computer system of claim 13, wherein, the code comprises at least one of source code, byte code and meta data.

15. The computer system of claim 13, wherein generating the test model comprises:
parsing the portion of the code;
identifying the code on which the portion of the code depends directly and indirectly; and
generating the test model composed of the model elements representing the portion of the code and the identified code.

16. The computer system of claim 13, wherein the test double element fulfills the same service contract as the code on which the portion of the code depends.

17. The computer system of claim 13, wherein the defined test double element fulfills a service contract of the code associated with the model elements, and wherein the dependency of the code defines the service contract.

18. The computer system of claim 13, wherein the generated one or more new code artefacts are stored as discrete artefacts in a repository using alternate names comprising one of a postfix to an original name, a prefix to the original name and having a randomly generated name.

* * * * *